(12) United States Patent
Aiba et al.

(10) Patent No.: US 9,207,424 B2
(45) Date of Patent: Dec. 8, 2015

(54) LENS DEVICE

(71) Applicant: FUJIFILM Corporation, Tokyo (JP)

(72) Inventors: Daigo Aiba, Saitama (JP); Hiroshi Nakamura, Saitama (JP); Atsushi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/596,378

(22) Filed: Jan. 14, 2015

(65) Prior Publication Data
US 2015/0124342 A1    May 7, 2015

Related U.S. Application Data

(63) Continuation of application No. PCT/JP2013/071771, filed on Aug. 12, 2013.

(30) Foreign Application Priority Data

Sep. 26, 2012  (JP) ................................. 2012-212505

(51) Int. Cl.
| | |
|---|---|
| *G02B 7/02* | (2006.01) |
| *G03B 17/14* | (2006.01) |
| *H04N 5/232* | (2006.01) |
| *G03B 13/34* | (2006.01) |
| *G02B 7/10* | (2006.01) |

(52) U.S. Cl.
CPC .................. *G02B 7/02* (2013.01); *G03B 13/34* (2013.01); *G03B 17/14* (2013.01); *H04N 5/23209* (2013.01); *G02B 7/10* (2013.01); *G02B 7/102* (2013.01)

(58) Field of Classification Search
CPC ..... H04N 5/2252; H04N 5/254; G02B 7/022; G02B 7/08; G02B 7/14; G02B 7/02; G03B 17/14; G03B 17/34; G03B 17/36; H01H 3/0206
USPC ................................... 359/676–706, 819–830
See application file for complete search history.

(56) References Cited

U.S. PATENT DOCUMENTS 3,200,699 A  *  8/1965  Graves ........................ 396/379

FOREIGN PATENT DOCUMENTS

| | | |
|---|---|---|
| JP | 09-200586 | 7/1997 |
| JP | 09-307801 | 11/1997 |
| JP | 10-023306 | 1/1998 |

(Continued)

OTHER PUBLICATIONS

International Search Report PCT/JP2013/071771 dated Nov. 19, 2013.

(Continued)

*Primary Examiner* — Mahidere Sahle
(74) *Attorney, Agent, or Firm* — Young & Thompson

(57) ABSTRACT

An object is to provide a lens device that can share a cable and can prevent the unnecessary exposure of the cable, and an imaging apparatus that includes the lens device. A lens device according to an embodiment of the invention, includes a lens barrel, a control unit that is provided on the lens barrel, a cable of which one end is connected to the control unit and the other end is connected to the imaging apparatus main body, and a housing portion in which the cable is wound and housed and which is provided with an opening through which the cable is led out. The cable is housed in a circumferential direction of the lens barrel, and a length of a portion of the cable led out through the opening is changed by the change of a length of a housed portion of the cable.

15 Claims, 16 Drawing Sheets

(56) References Cited

FOREIGN PATENT DOCUMENTS

| JP | 2001-337747 | 12/2001 |
| JP | 2008-112678 | 5/2008 |
| JP | 2008112678 A | * 5/2008 |

OTHER PUBLICATIONS

Written Opinion of the International Search Authority PCT/JP2013/071771 dated Nov. 19, 2013.

* cited by examiner

LENS DEVICE

CROSS-REFERENCE TO RELATED APPLICATIONS

This application is a Continuation of PCT International Application No. PCT/JP2013/071771 filed on Aug. 12, 2013, which claims priority under 35 U.S.C §119(a) to Japanese Patent Application No. 2012-212505 filed on Sep. 26, 2012. Each of the above applications is hereby expressly incorporated by reference, in its entirety, into the present application.

BACKGROUND OF THE INVENTION

1. Field of the Invention

The present invention relates to a lens device that is replaceably mounted on an imaging apparatus, and more particularly, to a technique that allows a cable of a lens device to be housed.

2. Description of the Related Art

It is preferable that a lens device replaceably mounted on an imaging apparatus main body can cope with various kinds of imaging apparatus main bodies. However, there is a lens device including a cable that is provided between the lens device and the imaging apparatus main body and is used to send and receive a signal for the control of a focus, a zoom, an iris, or the like. When this type of a lens device is to be mounted on various kinds of imaging apparatus main bodies, there is a case in which the connection position of a cable varies according to the structure of the imaging apparatus main body. That is, there is a case in which the required length of a cable varies according to the structure of imaging apparatuses.

A case in which a lens device having a long cable and a lens device having a short cable are produced according to the structure of the imaging apparatus main body is considered to deal with these situations. However, since a dedicated cable is required for each model in this case, costs or inventories are increased. Further, a case in which the case of a short cable is dealt with only the lens device having a long cable is also considered. However, if the exposure or slack of a cable occurs much in an imaging apparatus such as a monitoring camera, there is a concern that the cable may be broken due to trouble and appearance is also not good. For this reason, it is preferable that the exposure of the cable be as little as possible.

Considering these points, for example, JP1997-200586A (JP-H09-200586A) discloses a monitoring camera in which the lead-out position of a cable is devised and a cover is provided at a connection portion. Furthermore, in JP2008-112678A, a mechanism for winding a cable is provided on an imaging apparatus main body so that the slack of a cable does not occur.

SUMMARY OF THE INVENTION

However, the related art disclosed in JP1997-200586A (JP-H09-200586A) and JP2008-112678A could not sufficiently deal with a request for the cable of the lens device that is caused by the structure of the imaging apparatus main body. For example, in the technique disclosed in JP1997-200586A (JP-H09-200586A), a plurality of lens devices having different cable lengths need to be prepared according to the structure of the imaging apparatus main body, and the exposure of the cables occurs for a long time when the lens devices are provided with long cables so as to correspond to a plurality of imaging apparatuses. Meanwhile, since the imaging apparatus main body is provided with a cable winding structure in the technique disclosed in JP2008-112678A, there is a problem in that the structure of the cable connection portion (a connector) of the lens device is restricted and only an imaging apparatus main body having such a specific structure can be combined and used.

The invention has been made in consideration of these circumstances, and an object of the invention is to provide a lens device that can share a cable and can prevent the unnecessary exposure of the cable.

In order to achieve the above-mentioned object, according to a first aspect of the invention, there is provided a lens device that is replaceably mounted on an imaging apparatus main body. The lens device includes a lens barrel, a control unit that is provided on the lens barrel, a cable of which one end is connected to the control unit and the other end is connected to the imaging apparatus main body, and a housing portion in which the cable is housed and which is provided with an opening through which the cable is led out. The cable is housed in a circumferential direction of the lens barrel, and a length of a portion of the cable led out through the opening is changed by the change of a length of a housed portion of the cable.

Since the cable is housed in the circumferential direction in the first aspect, it is possible to change the lead-out length of the cable by adjusting the length of a housed portion of the cable. Accordingly, it is also possible to deal with cases in which the required length of the cable varies according to the structure of the imaging apparatus, by reducing the length of the housed portion of the cable when the lead-out length of the cable is long, conversely, by increasing the length of the housed portion of the cable when the lead-out length of the cable is short. Therefore, it is possible to appropriately use a short cable and a long cable (to share a cable) regardless of plural kinds of cables, so that it is possible to produce a lens device in the forms of plural kinds of models in which the lead-out length of the cable varies. Further, since it is possible to adjust the lead-out length of the cable by changing the length of the housed portion of the cable, it is possible to prevent the unnecessary exposure of the cable and to prevent mischief while ensuring good appearance.

In regard to the form of the cable housed in the housing portion in the first aspect, the cable may be housed so as to be wound in a circumferential direction, and the cable may be housed so as to meander or be folded back. Here, the length of a wound portion, a meandering portion, or a folded portion of the cable, the number of times of the winding, meandering, and folding of the cable, or the like may be determined according to the lead-out length of the cable. Meanwhile, the "control unit" of the first aspect includes control units (for example, a motor, a galvanometer, and the like) that control a zoom lens, a focus lens, an iris and the like included in the lens device.

According to a second aspect of the invention, in the lens device according to the first aspect, the housing portion includes a ring member which is detachably mounted on the lens barrel and of which a center corresponds to an optical axis of the lens barrel when the ring member is mounted, the cable is housed between an inner wall ring and an outer wall ring forming the ring member and having different diameters, and the outer wall ring is provided with the opening and the cable is led out. In the second aspect, it is possible to adjust the length of a portion of the cable led out through the opening by changing the length of the portion of the cable housed between the inner and outer wall rings (by changing, for example, the length of a wound portion, a meandering portion, or a folded portion of the cable, the number of times of the winding, meandering, and folding of the cable, or the like); and to prevent the housed portion of the cable from being exposed to the outside by the outer wall ring.

According to a third aspect of the invention, in the lens device according to the first or second aspect, the ring member is mounted between the lens barrel and a mount member that is used to mount the lens device on the imaging apparatus main body. The third aspect is to define one aspect in which the ring member is mounted.

According to a fourth aspect of the invention, in the lens device according to any one of the first to third aspects, the cable includes a length regulating member and the length regulating member is fitted to the opening. Since the cable includes the length regulating member in the fourth aspect, it is possible to adjust the lead-out length of the cable and to prevent the change of the lead-out length of the cable. One or a plurality of length regulating members may be provided, and it is possible to adjust the lead-out length of the cable in stages according to the number of the length regulating members by fitting the length regulating member to the opening. It is possible to adjust the lead-out length of the cable in two stages by fitting any one of length regulating members, which are provided at, for example, two positions, to the opening.

According to a fifth aspect of the invention, in the lens device according to the fourth aspect, the length regulating member includes two flanges between which the opening is interposed. In the fifth aspect, the lead-out length of the cable can be fixed when the length regulating member is fitted to the opening by these flanges.

According to a sixth aspect of the invention, in the lens device according to the first aspect, the housing portion is a recess which is formed at a part of the lens barrel in a direction of the optical axis and of which a diameter is smaller than a diameter of the other portion. In a certain kind of lens device, light flux is focused and the diameter of a barrel is reduced at a rear portion of the barrel. Since the cable is housed in a portion, which has a small diameter, of the lens barrel in the sixth aspect, an increase in the diameter of the housing portion is prevented.

According to a seventh aspect of the invention, the lens device according to the sixth aspect further includes a cover that is detachably mounted on the recess, and the cable is exposed to the outside when the cover is removed. Since the lens device includes the detachable cover as in the seventh aspect, it is possible to easily change the length of the housed portion of the cable and to easily set the lead-out length of the cable by changing the length of the housed portion of the cable. For example, it is possible to increase the lead-out length of the cable by removing the cover, stretching the cable housed in the housing portion, and leading out the cable through the opening; and to reduce the lead-out length of the cable by increasing the length of the portion of the cable housed in the housing portion.

According to an eighth aspect of the invention, the lens device according to the sixth or seventh aspect further includes a guide member which is formed in the recess in the circumferential direction of the lens barrel and along which the cable is led. Since the cable is positioned in the recess by the guide member in the eighth aspect, the cable can be stably housed.

According to a ninth aspect of the invention, in the lens device according to the first to eighth aspects, the control unit is an iris control unit and the cable is an iris cable. Since an imaging apparatus, such as a monitoring camera, usually takes an image in a constant direction and at a constant distance, a zoom or a focus is commonly fixed when the imaging apparatus is installed. However, even in such a case, there is a lens device that is provided with an iris control unit to control the iris according to the brightness at an imaging location and the change of the brightness. The ninth aspect is to define the lens device that includes the iris control unit.

According to the lens device and the imaging apparatus of the invention, it is possible to share a cable and to prevent the unnecessary exposure of the cable as described above.

DESCRIPTION OF THE PREFERRED EMBODIMENTS

First Embodiment

Figure 1:
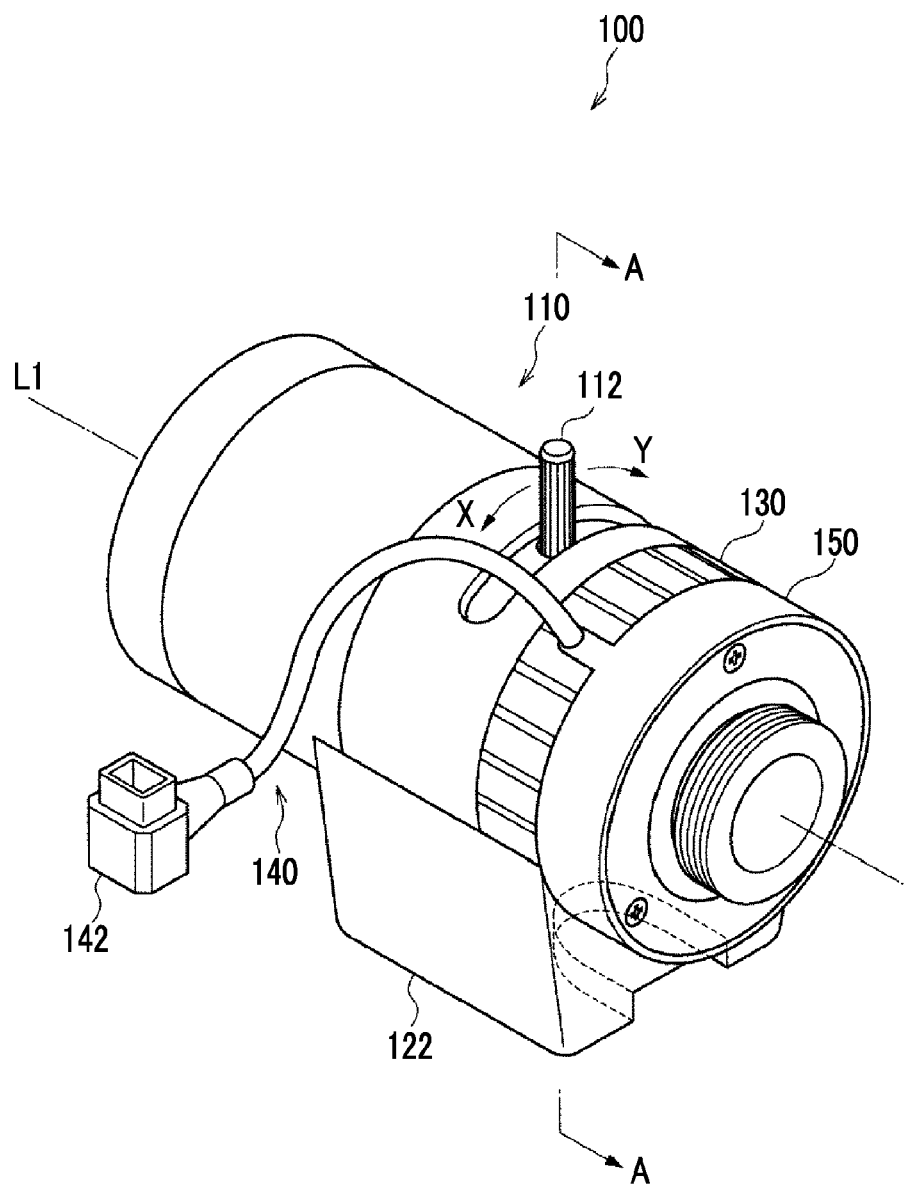
FIG. 1 is a view showing a lens device according to a first embodiment of the invention.

<Structure of Lens Device>
An embodiment of a lens device according to the invention will be described in detail below with reference to the accompanying drawings. FIG. 1 is a view showing a lens device 100 (a lens device) for a monitoring camera according to a first embodiment of the invention. As shown in FIG. 1, the lens device 100 according to this embodiment includes a lens barrel 110 (a lens barrel), a ring member 130 (a housing portion), an iris cable 140 (a cable or an iris cable), and a mount member 150 (a mount member). As described in detail below, the iris cable 140 is led out through an opening 136 that is formed by the ring member 130 and the mount member 150. The lens device 100 is replaceably mounted on a monitoring camera main body (an imaging apparatus main body) and forms a monitoring camera (an imaging apparatus). Further, the lens device 100 includes an iris meter 120 as described below, and the iris meter 120 and a connection portion between the iris meter 120 and the iris cable 140 are covered with an iris meter cover 122.

The lens barrel 110 includes an imaging lens, a zoom lens, a focus lens, and an iris (not shown) that are provided therein. When a focus adjustment lever 112 is moved in an X-Y direction of FIG. 1, the focus lens is moved back and forth in the direction of an optical axis L1 by a mechanism, such as a cam member and a cam groove (not shown). As a result, focusing is performed. Meanwhile, a zoom adjustment lever may be provided in the lens device 100 in the same manner as that of the focus adjustment lever 112. Furthermore, focus/zoom adjustment may be performed not by a lever but by the rotation of an adjustment ring. Alternatively, a focus/zoom adjustment motor may be provided so as to perform focus/zoom adjustment in response to a signal that is sent from the monitoring camera main body.

Figure 2:
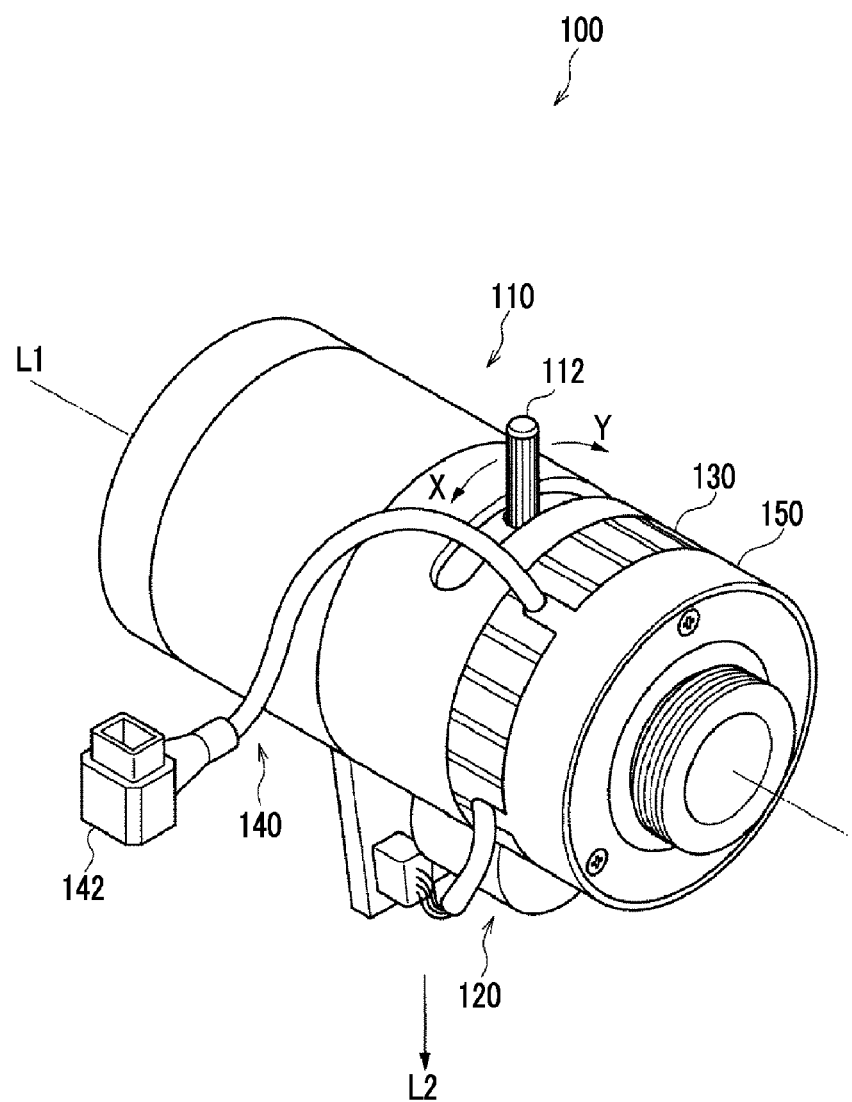
FIG. 2 is a view showing the lens device according to the first embodiment of the invention and showing an aspect in which an iris meter 120 is mounted.

Moreover, as shown in FIG. 2, an iris meter 120 (a control unit or an iris control unit) is provided on the outer periphery of the lens barrel 110 so as to protrude in a direction L2 orthogonal to the optical axis L1. The iris meter 120 is to drive an iris (not shown). When a base end portion of the iris cable 140 is connected to the iris meter 120 and a connector 142 provided at a tip portion of the iris cable 140 is connected to a connector of the monitoring camera main body (not shown), power and a signal are supplied to the iris meter 120 from the monitoring camera main body. As a result, the iris is driven by the iris meter 120.

Figure 3A:
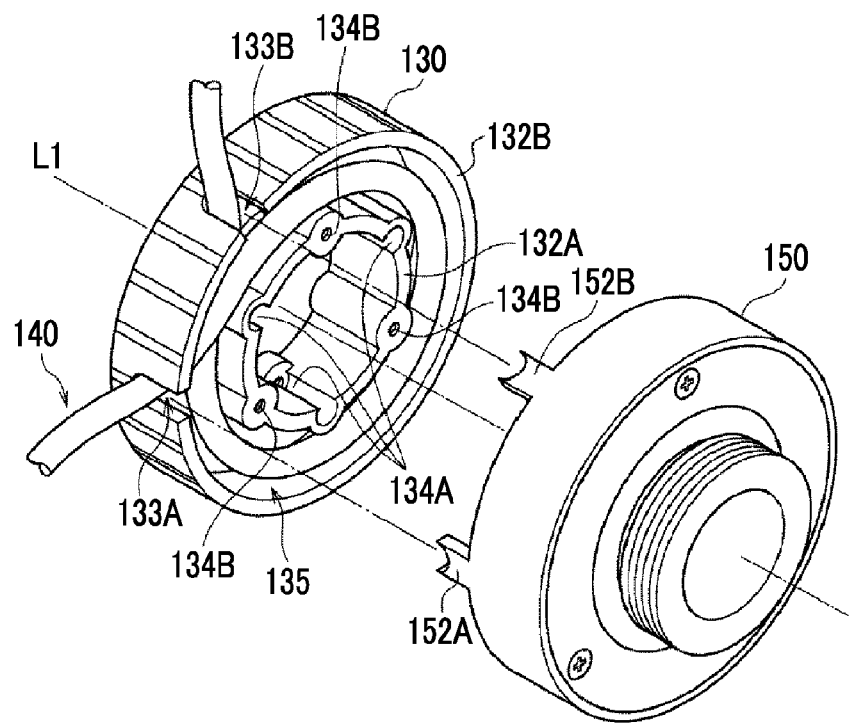
FIGS. 3A and 3B are views showing an aspect in which an iris cable is wound in a ring member of the lens device shown in FIG. 1.
Figure 3B:
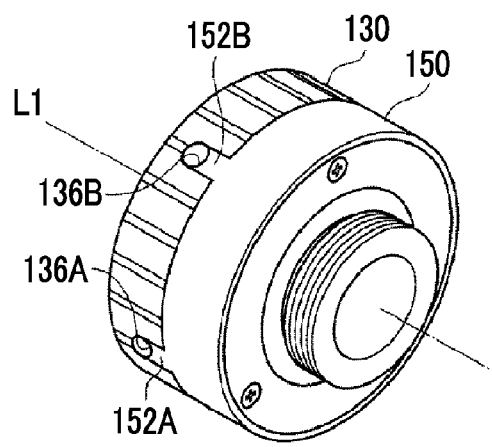

FIGS. 3A and 3B are views showing an aspect in which the iris cable 140 of the lens device 100 is housed. As shown in FIG. 3A, the ring member 130 includes an inner wall ring 132A (a housing portion) and an outer wall ring 132B (a housing portion) having different diameters, these rings are connected to each other at a tip of the ring member 130 in the direction of the optical axis L1, and a base end portion of the ring member 130 is opened. Accordingly, a space 135 (a housing portion) is formed between the inner wall ring 132A and the outer wall ring 132B. Further, U-shaped notches 133A and 133B (openings) are formed at two positions on the outer wall ring 132B, and protrusions 152A and 152B for pressing the cable are formed at positions corresponding to the notch 133A and 133B on the mount member 150. Accordingly, when the ring member 130 and the mount member 150 are joined to each other, circular openings 136A and 136B (openings) are formed by the notches 133A and 133B and the protrusions 152A and 152B as shown in FIG. 3B. The iris cable 140 is introduced into the space 135 from one opening 136A, and is wound in the space 135 and is led out through the other opening 136B.

The ring member 130 is joined to the lens barrel 110 through screw holes 134A that are formed at three positions on the inner wall ring 132A in a circumferential direction, and is likewise joined to the mount member 150 through screw holes 134B. Further, the lens device 100 and the monitoring camera main body are joined to each other with the mount member 150 interposed therebetween. In this state, the center of the ring member 130 and the center of the mount member 150 correspond to the optical axis L1 of the lens device 100.

Figure 4:
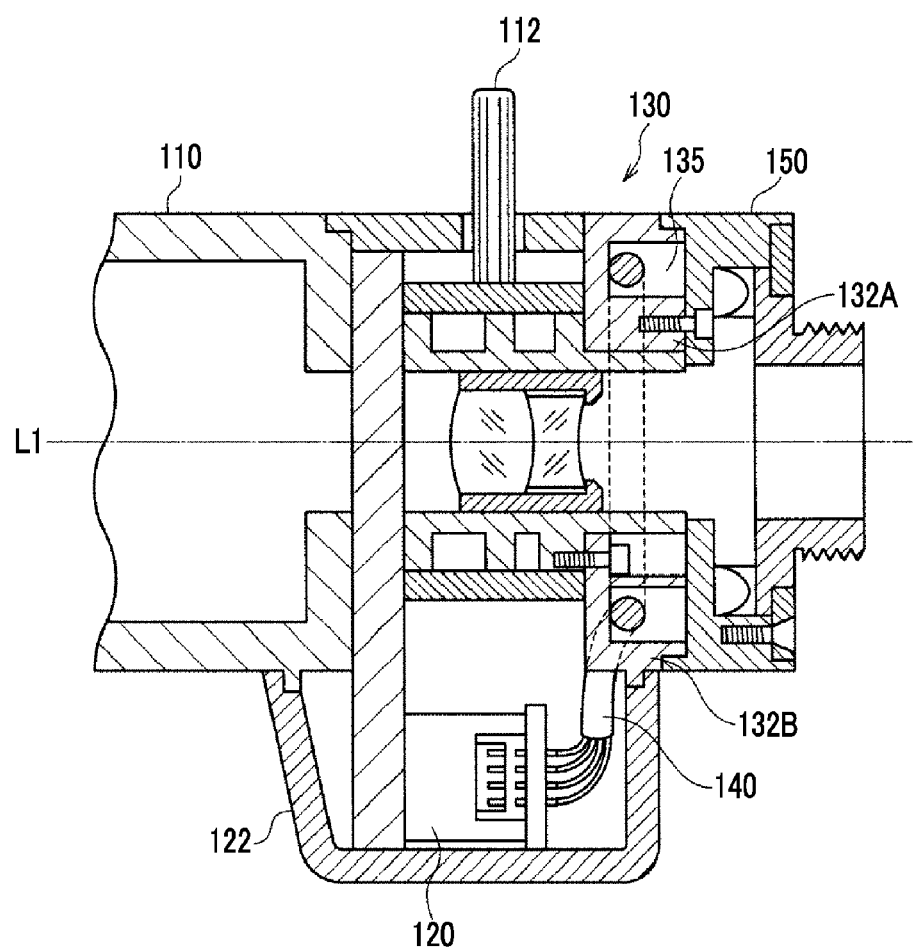
FIG. 4 is a cross-sectional view of the ring member and a mount member of the lens device shown in FIG. 1.

FIG. 4 is a cross-sectional view taken along an A-A direction of FIG. 1 when the lens barrel 110, the ring member 130, and the mount member 150 are joined to each other, and shows an aspect in which the iris cable 140 is wound in the space 135.

<Adjustment of Lead-Out Length of Cable>

Next, an example of the adjustment of the lead-out length of the cable of the lens device 100 having the above-mentioned structure will be described. In this embodiment, first, after the mount member 150 is removed from the ring member 130, the iris cable 140 is introduced into the space 135 from one opening 136A, is wound about one time in the space 135, and is led out through the other opening 136B. This state is a state shown in FIG. 3A. The ring member 130 and the mount member 150 are fitted and screwed to each other in this state so that the notches 133A and 133B correspond to the protrusions 152A and 152B, respectively. This state is a state shown in FIG. 3B, and the entire device is fixed in a state in which the lead-out length of the iris cable 140 is short as shown in FIG. 1.

Figure 5:
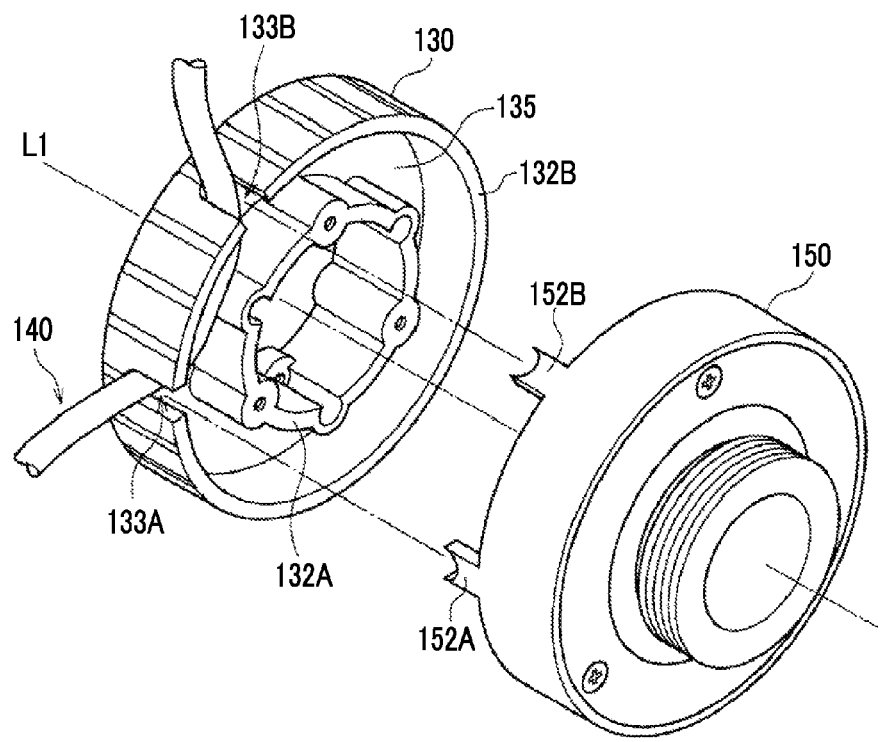
FIG. 5 is another view showing an aspect in which the iris cable is wound in the ring member of the lens device shown in FIG. 1.
Figure 6:
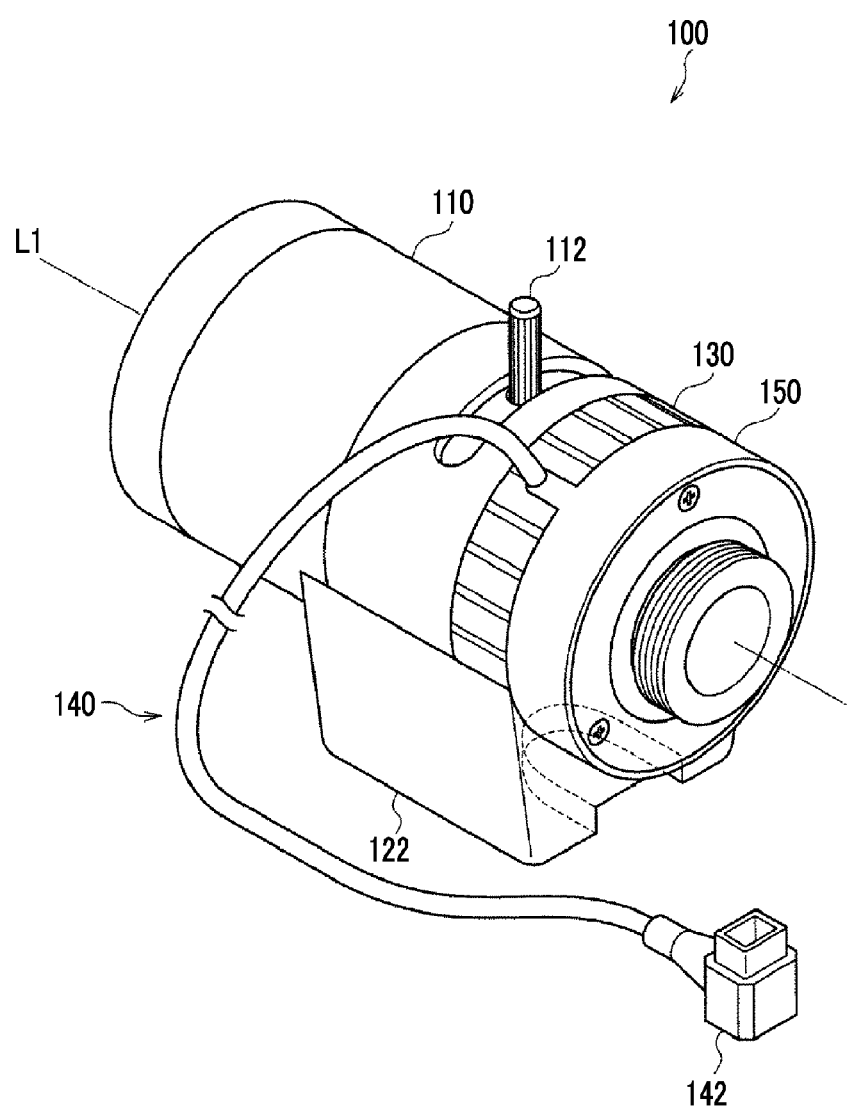
FIG. 6 is a view showing a state in which the lead-out length of the iris cable is made long in the lens device shown in FIG. 1.

When the lead-out length of the iris cable 140 is to be increased by the structure (the position of the connector or the like) of the monitoring camera main body, the mount member 150 is removed from the state of FIG. 1 and the iris cable 140 introduced from one opening 136A is led out through the other opening 136B. This state is a state shown in FIG. 5. Then, when the ring member 130 and the mount member 150 are fitted and screwed to each other in the state shown in FIG. 5 so that the notches 133A and 133B correspond to the protrusions 152A and 152B, respectively, the ring member 130 and the mount member 150 are fixed to each other in a state in which the lead-out length of the iris cable 140 is long as shown in FIG. 6.

Since the lead-out length of the iris cable 140 can be adjusted according to the structure of the monitoring camera main body in the lens device 100 according to the first embodiment as described above, it is possible to share the cable. Further, when the lead-out length of the cable is short, it is possible to suppress the exposure of the iris cable 140 to the outside of the ring member 130 as much as possible by winding the iris cable 140 in the ring member 130 many times.

Figure 7:
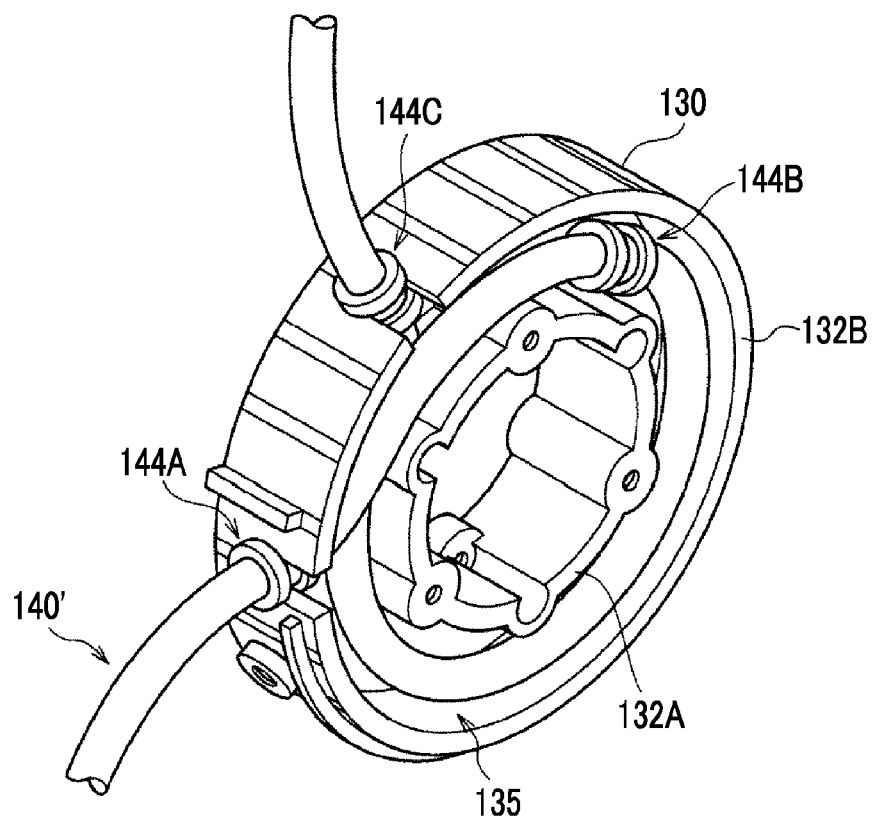
FIG. 7 is a view showing a state in which cable bushes are provided on the iris cable and are fitted to openings, and is a view showing a state in which the length of a wound portion of the iris cable is increased so that the lead-out length of the iris cable is reduced.
Figure 8:
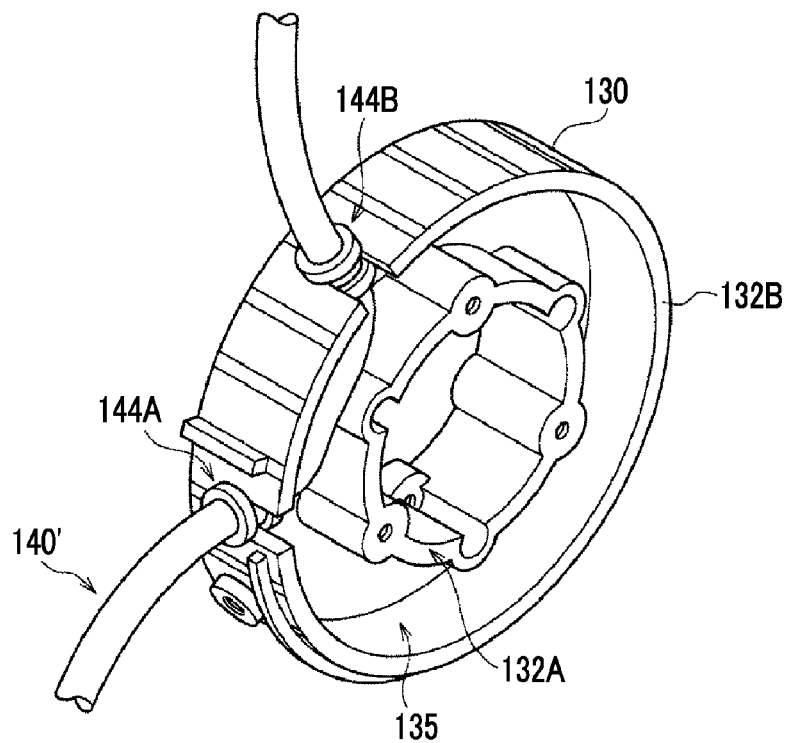
FIG. 8 is another view showing a state in which the cable bushes are provided on the iris cable and are fitted to the openings, and is a view showing a state in which the length of a wound portion of the iris cable is reduced so that the lead-out length of the iris cable is increased.
Figure 9:
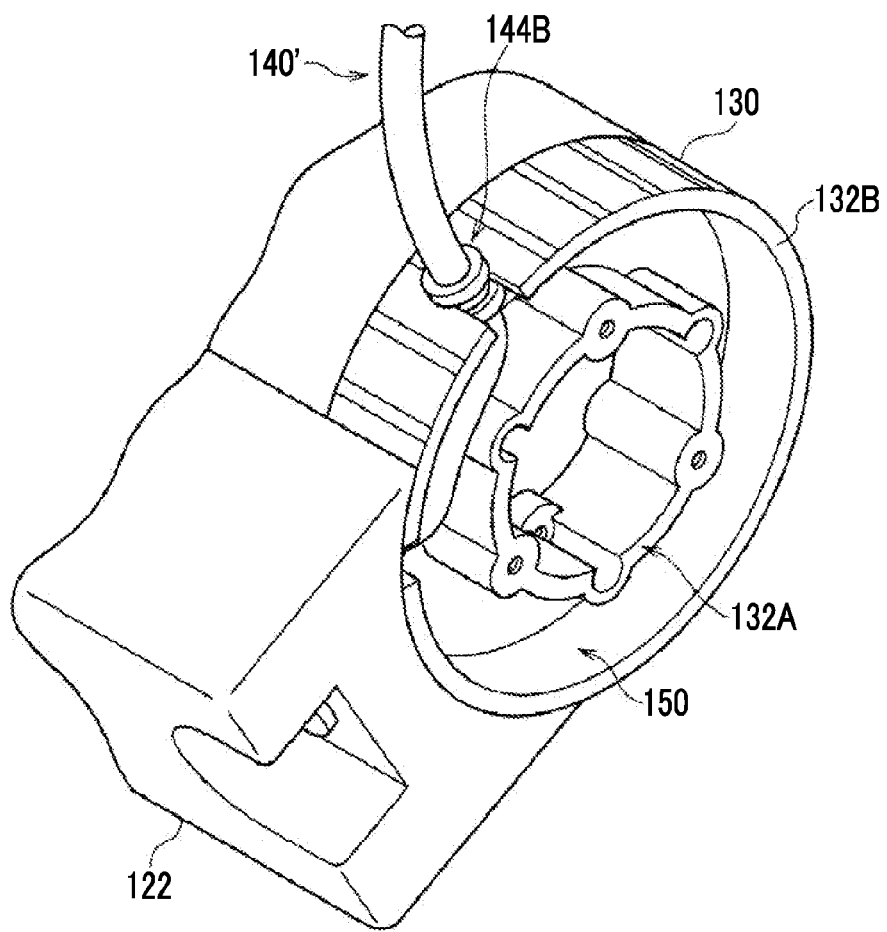
FIG. 9 is still another view showing a state in which the cable bushes are provided on the iris cable and are fitted to the openings, and is a view showing a state in which an iris meter cover is mounted.
Figure 10:
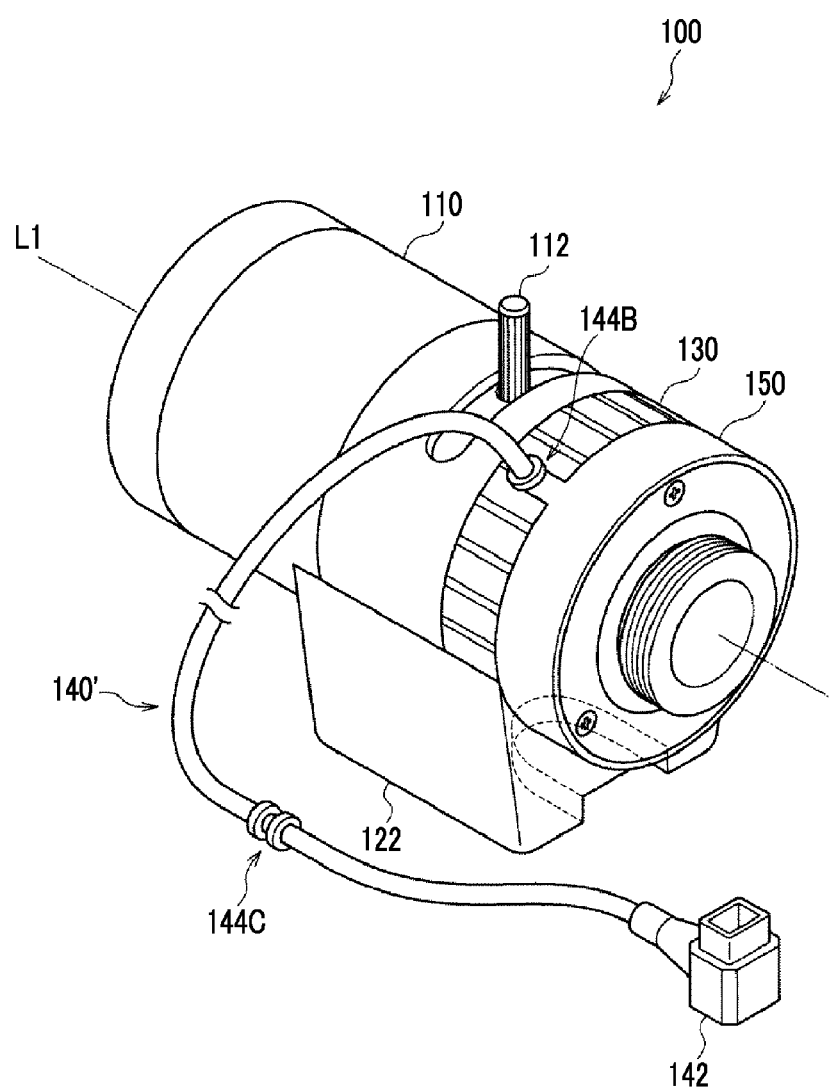
FIG. 10 is a view showing a state in which the lead-out length of the iris cable is increased in the lens device shown in FIG. 1.

Meanwhile, length regulating members may be provided on the iris cable 140 and may be fitted to the openings 136 in this embodiment, so that the iris cable can be stably fixed and housed. FIG. 7 is a view showing a state in which an iris cable 140' (a cable or an iris cable) on which cable bushes (length regulating members) as the length regulating members are provided is wound and housed in the ring member 130, and corresponds to the state shown in FIG. 3A. Three cable bushes 144A, 144B, and 144C (length regulating members) are provided on the iris cable 140' as shown in FIG. 7, each of the cable bushes includes two flanges, and each opening is interposed between the flanges. Specifically, the cable bush 144A is fitted to one opening 136A and the cable bush 144C is fitted to the other opening 136B. For an increase in the lead-out length of the iris cable 140', the cable bush 144A is fitted to one opening 136A and the cable bush 144B is fitted to the other opening 136B as shown in FIG. 8 and FIG. 9 (a state in which the cover 122 is mounted) in the same order as the above-mentioned order. The appearance of the entire device in this state is shown in FIG. 10. It is possible to stably fix and house the iris cable 140' and to prevent the unintended lead of the iris cable 140' that is caused by trouble or the like and damage that is caused by the unintended lead of the iris cable 140', by fitting the cable bushes 144A, 144B, and 144C to the openings 136 in this way.

Second Embodiment

Figure 11:
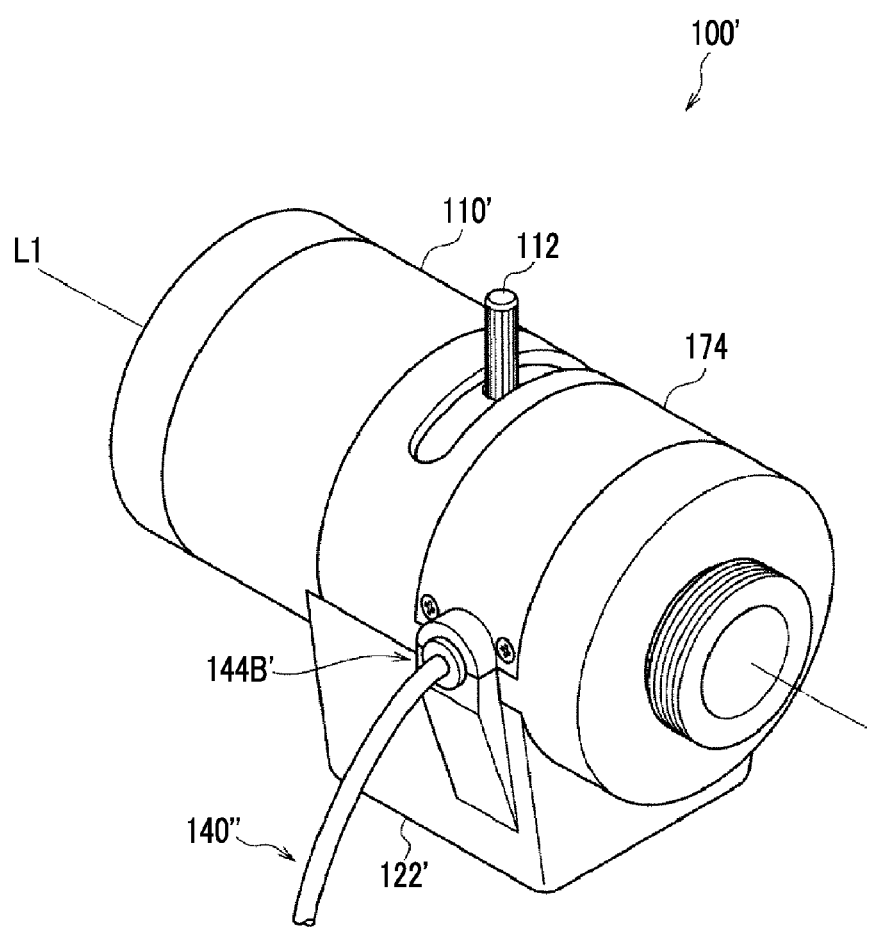
FIG. 11 is a view showing a lens device according to a second embodiment of the invention.

Next, another embodiment of the lens device according to the invention will be described. FIG. 11 is a view showing a lens device 100' according to a second embodiment. Meanwhile, in the following description, the same components as the components of FIGS. 1 to 10 will be denoted by common reference numerals and the description thereof will be omitted.

As shown in FIG. 11, the lens device 100' according to this embodiment includes a lens barrel 110' (a lens barrel). The lens device 100' is replaceably mounted on a monitoring camera main body (an imaging apparatus main body), and forms a monitoring camera (an imaging apparatus). Further, the lens device 100' includes the same iris meter 120 (not shown in FIG. 11) as the iris meter of the lens device 100, and the iris meter 120 and a connection portion between the iris meter 120 and an iris cable 140" (a cable or an iris cable) are covered with a cover 122'.

Figure 12:
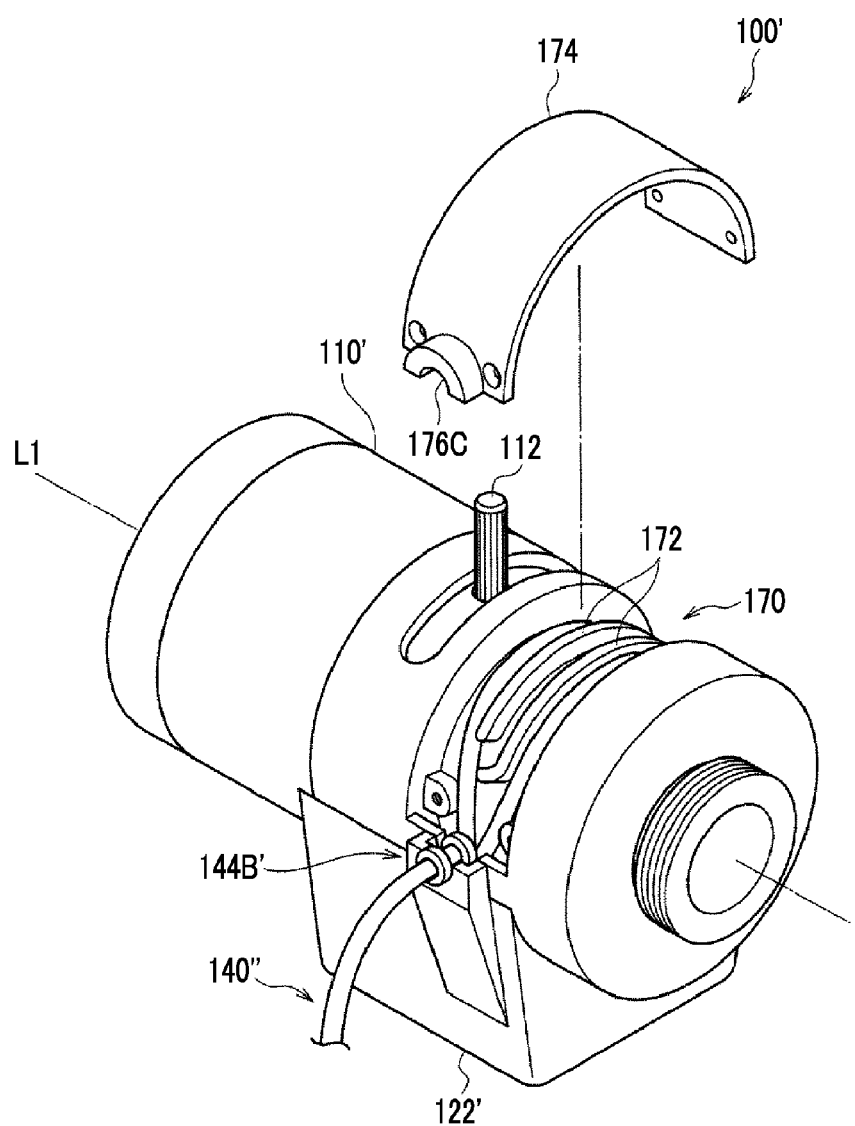
FIG. 12 is a view showing a state in which a cover is removed from the lens device shown in FIG. 11.
Figure 13:
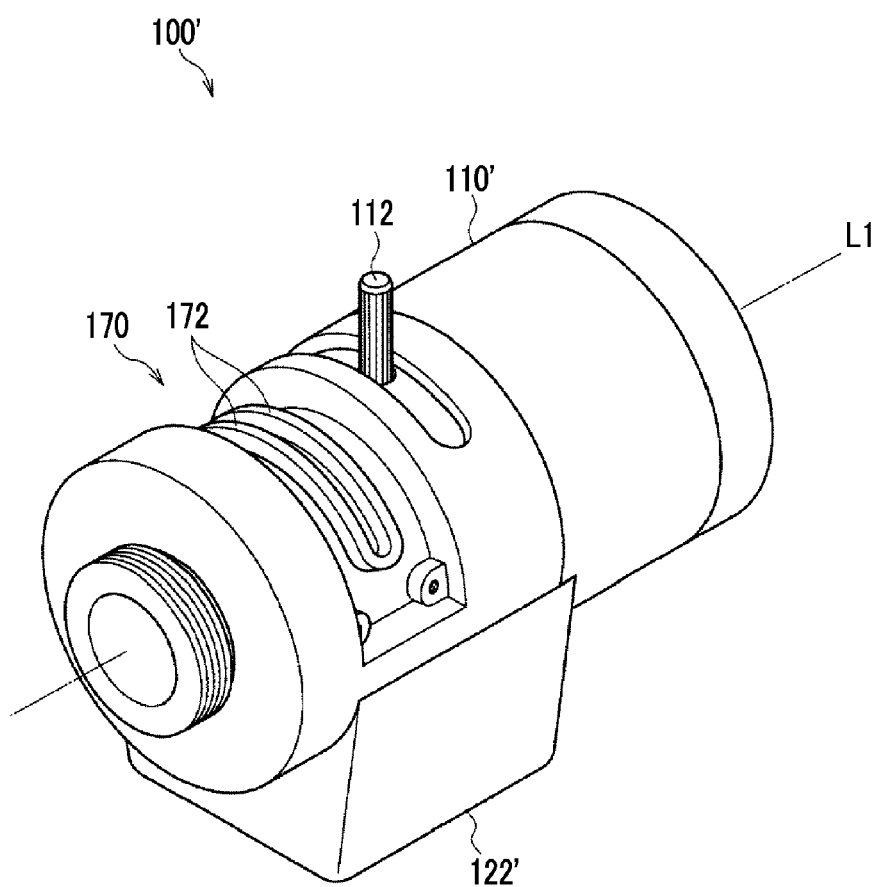
FIG. 13 is another view showing a state in which the cover is removed from the lens device shown in FIG. 11, and is a view showing a state seen in a direction different from a direction in FIG. 12.
Figure 14:
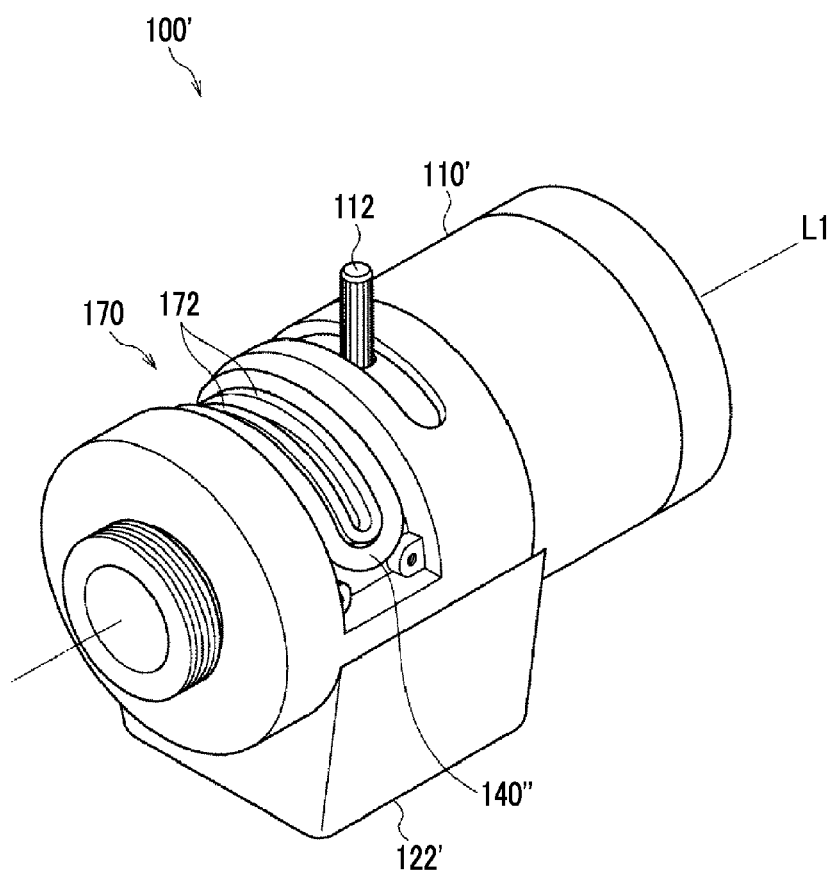
FIG. 14 is a view showing a state in which an iris cable is wound in the lens device shown in FIG. 13.

In the lens device 100 according to the first embodiment, the iris cable 140 is wound and housed in the space 135 formed in the ring member 130. However, in the lens device 100' according to this embodiment, as shown in FIG. 12, a recess 170 (a housing portion or a recess) of which the diameter is smaller than the diameter of the other portion of the lens barrel 110' is formed at a part of the lens barrel 110' in the direction of an optical axis and the iris cable 140" is wound and housed in the recess 170 so as to be folded back. As shown in FIG. 12, in the lens device 100', a guide member 172 (a housing portion or a guide member) is formed in the recess 170 in the circumferential direction of the lens barrel 110'. Accordingly, it is possible to stably house the iris cable 140" by leading the iris cable 140" along the guide member 172. A detachable recess cover 174 (a housing portion or a cover) is screwed to the recess 170. Accordingly, when the recess cover 174 is removed, the iris cable 140" wound and housed in the recess 170 is exposed to the outside. Meanwhile, FIGS. 13 and 14 are views showing the lens device 100' that is seen in a direction opposite to the direction of FIGS. 11 and 12.

Figure 15:
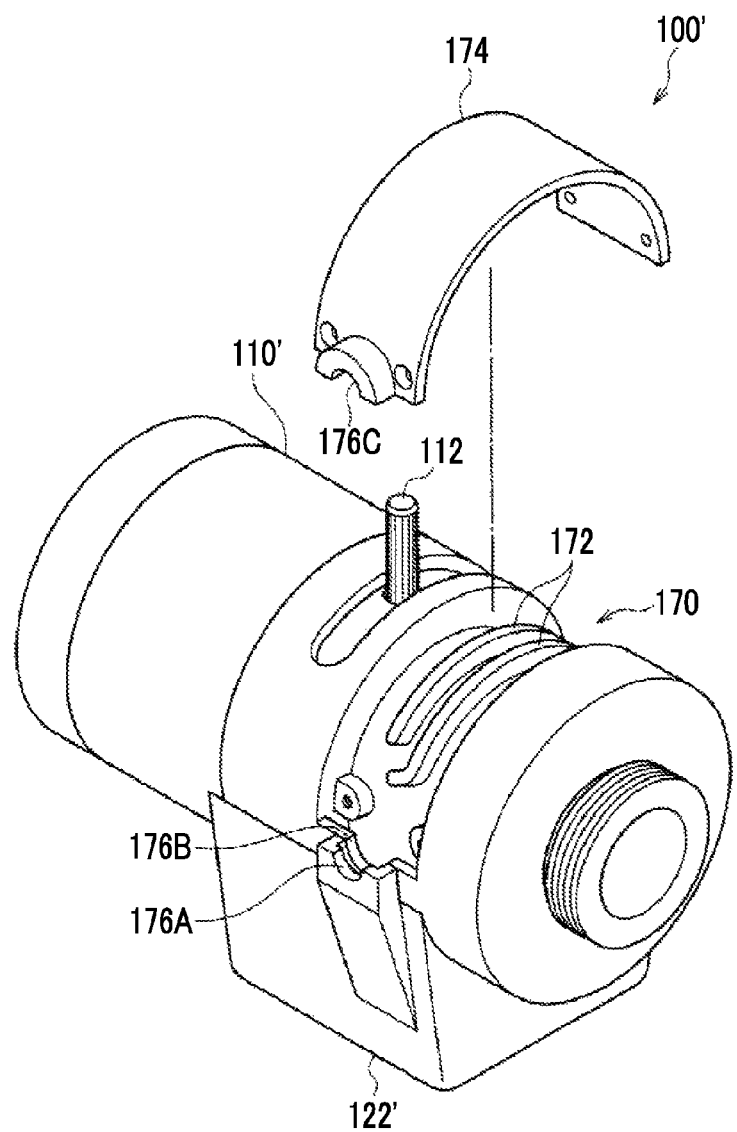
FIG. 15 is a view showing a state in which an opening for the lead out of the iris cable is formed in the lens device shown in FIG. 11.

Further, as shown in FIG. 15, a notch 176A is formed at an iris meter cover 122' and notches 176B and 176C (an opening) are formed at the recess 170 and the recess cover 174, respectively. Accordingly, when the recess cover 174 is mounted on the recess 170, the notches 176A, 176B, and 176C form an opening. The iris cable 140" is led out through this opening in the lens device 100' according to this embodiment. Cable bushes 144A' and 144B', each of which includes two flanges, are provided on the iris cable 140" as in the above-mentioned iris cable 140'. Accordingly, when each of these cable bushes is fitted to the opening, the lead-out length of the iris cable 140" is fixed.

Figure 16:
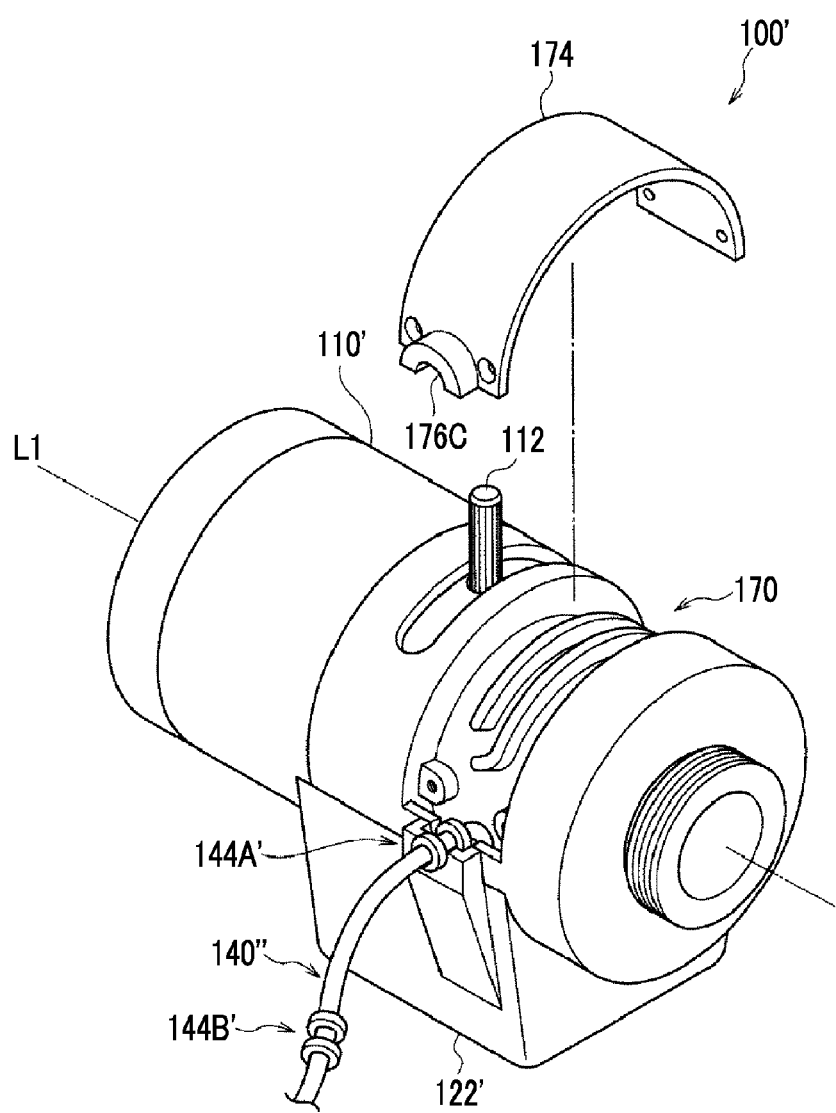
FIG. 16 is a view showing a state in which the lead-out length of the iris cable is increased in the lens device shown in FIG. 11.

Even in the lens device 100' having the above-mentioned structure, it is possible to adjust the lead-out length of the iris cable 140" as in the lens device 100. Specifically, when the lead-out length of the iris cable is to be reduced, the iris cable 140" is wound so as to be folded back along the guide member 172 in the recess 170 as shown in FIG. 12, the cable bush 144A' is fitted to the notch 176A, and the recess cover 174 is mounted. Meanwhile, when the lead-out length of the iris cable is to be increased, the iris cable 140" may not be folded back in the recess 170 as shown in FIG. 16, the cable bush 144B' may be fitted to the notches 176A and 176B, and the recess cover 174 may be mounted.

In the lens device 100' according to this embodiment, the lead-out length of the iris cable 140" can be adjusted according to the structure of the monitoring camera main body as described above as in the lens device 100 according to the first embodiment. Accordingly, it is possible to share the cable and to suppress the exposure of the iris cable 140" as much as possible.

The invention has been described above using the embodiments, but the technical scope of the invention is not limited to the description of the embodiments. It is apparent to those skilled in the art that the embodiments can be modified or improved in various ways. It is apparent from the description of claims that embodiments modified or improved in these ways can also be included in the technical scope of the invention.

It should be noted that procedures of processing of operations, orders, steps, processes, and the like of devices, systems, programs, and methods disclosed in claims, the specification, and drawings be performed in an arbitrary order as long as description is not particularly made using "before", "prior to", or the like and an output of previous processing is not used in subsequent processing. Even though operating flows described in claims, the specification, and the drawings are described using "first", "next", or the like for convenience, it is not meant that the operating flows be necessarily performed in this order.

What is claimed is:

1. A lens device that is replaceably mounted on an imaging apparatus main body, the lens device comprising:
   a lens barrel;
   a control unit that is provided on the lens barrel;
   a cable of which one end is connected to the control unit and the other end is connected to the imaging apparatus main body; and
   a housing portion in which the cable is housed and which is provided with an opening through which the cable is led out,
   wherein the cable is housed in a circumferential direction of the lens barrel,
   a length of a portion of the cable led out through the opening is changed by the change of a length of a portion of the cable housed in the housing portion,
   the housing portion includes a ring member which is detachably mounted on the lens barrel and of which a center corresponds to an optical axis of the lens barrel when the ring member is mounted on the lens barrel,
   the cable is housed between an inner wall ring and an outer wall ring forming the ring member and having different diameters, and
   the outer wall ring is provided with the opening and the cable is led out from the opening.

2. The lens device according to claim 1,
   wherein the ring member is mounted between the lens barrel and a mount member that is used to mount the lens device on the imaging apparatus main body.

3. The lens device according to claim 1,
   wherein the cable includes a length regulating member and the length regulating member is fitted to the opening.

4. The lens device according to claim 2,
   wherein the cable includes a length regulating member and the length regulating member is fitted to the opening.

5. The lens device according to claim 3,
   wherein the length regulating member includes two flanges between which the opening is interposed.

6. The lens device according to claim 4,
wherein the length regulating member includes two flanges between which the opening is interposed.

7. The lens device according to claim 1, further comprising a focus adjustment lever configured to move a focus lens in a direction of an optical axis.

8. The lens device according to claim 1, wherein the opening is a U-shaped notch.

9. The lens device according to claim 8, wherein a protrusion is configured to press the cable at a position corresponding to the U-shaped notch.

10. The lens device according to claim 1, wherein a cable bush is provided on the cable, and the cable bush is fitted to the opening.

11. A lens device that is replaceably mounted on an imaging apparatus main body, the lens device comprising:
   a lens barrel;
   a control unit that is provided on the lens barrel;
   a cable of which one end is connected to the control unit and the other end is connected to the imaging apparatus main body; and
   a housing portion in which the cable is housed and which is provided with two openings through which the cable is led out,
   wherein the cable is housed in a circumferential direction of the lens barrel,
   a length of a portion of the cable led out through at least one of the two openings is changed by the change of a length of a portion of the cable housed in the housing portion,
   the housing portion includes a ring member which is detachably mounted on the lens barrel and of which a center corresponds to an optical axis of the lens barrel when the ring member is mounted on the lens barrel,
   the cable is housed between an inner wall ring and an outer wall ring forming the ring member and having different diameters, and
   the outer wall ring is provided with the two opening and the cable is led out from the two openings.

12. The lens device according to claim 11,
wherein the ring member is mounted between the lens barrel and a mount member that is used to mount the lens device on the imaging apparatus main body.

13. The lens device according to claim 11,
wherein the cable includes at least one length regulating member and the length regulating member is fitted to at least one of the two openings.

14. The lens device according to claim 12,
wherein the cable includes at least one length regulating member and the length regulating member is fitted to at least one of the two openings.

15. The lens device according to claim 13, wherein the at least one length regulating member includes two flanges between which the opening is interposed.

* * * * *